G. H. MOORE.
POULTRY FEEDER.
APPLICATION FILED MAR. 15, 1915.

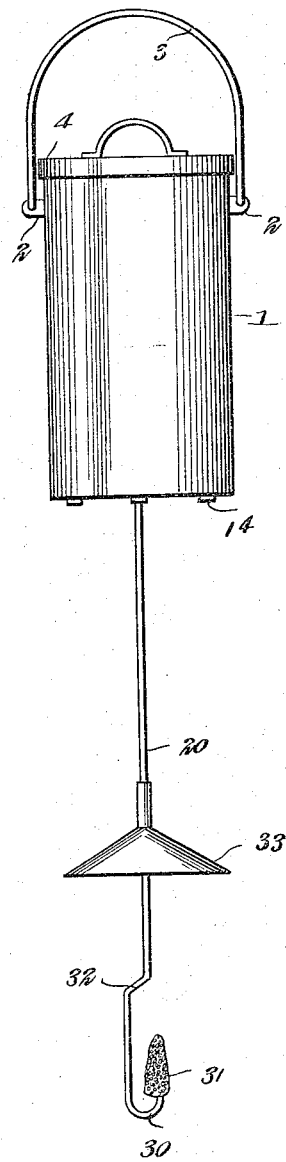
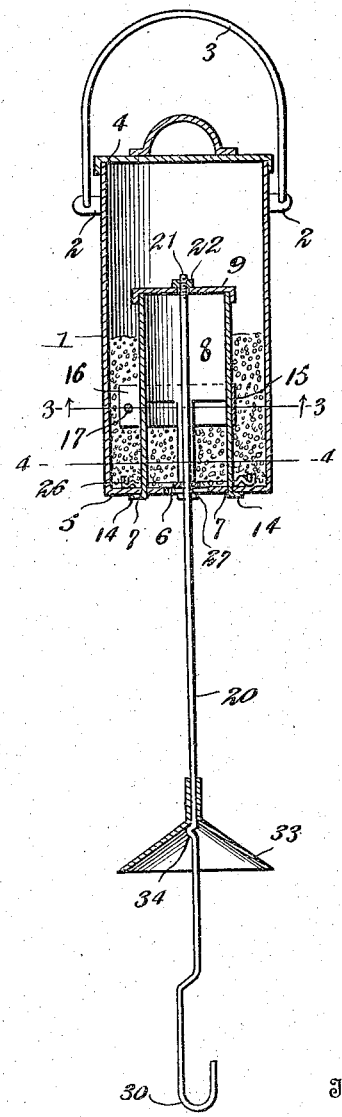

1,170,773.

Patented Feb. 8, 1916.
2 SHEETS—SHEET 2.

Witnesses
Frederick W. Ely.
Perry H. Pattison.

Inventor
George H. Moore.

By Mansell F. Mills
Attorney

UNITED STATES PATENT OFFICE.

GEORGE H. MOORE, OF NEW CASTLE, PENNSYLVANIA.

POULTRY-FEEDER.

1,170,773. Specification of Letters Patent. Patented Feb. 8, 1916.

Application filed March 15, 1915. Serial No. 14,379.

*To all whom it may concern:*

Be it known that I, GEORGE H. MOORE, a citizen of the United States, residing at New Castle, in the county of Lawrence and State of Pennsylvania, have invented certain new and useful Improvements in Poultry-Feeders, of which the following is a specification.

This invention relates to new and useful improvements in poultry feeders, and has for one of its objects to provide a device of this character which will be cheap to manufacture.

A further object of the invention is to provide a device of this character which will be thoroughly efficient in operation, and simple in construction.

A further object of the present invention is to provide a device of this character which can be adjusted to properly discharge any of the various grains which are employed for feeding poultry.

A further object of the invention is to provide a device which is operated at will by the poultry.

Figure 3:
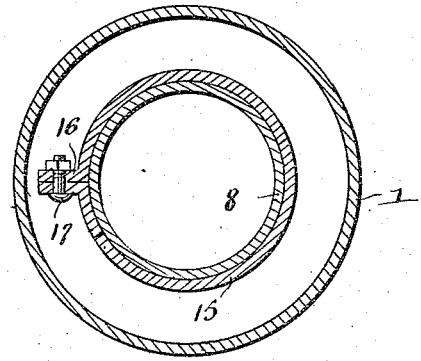
Figure 4:
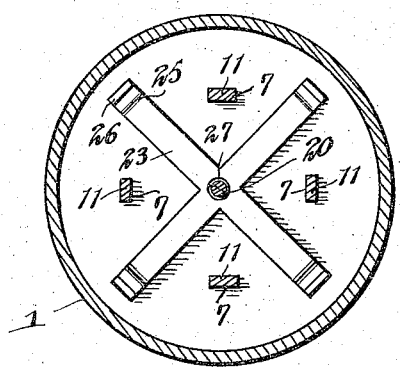
Figure 5:
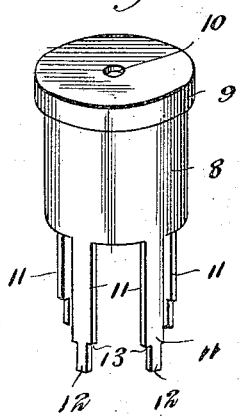
Figure 6:
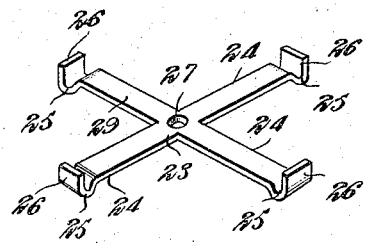

Referring to the drawings; Figure 1 is a view in elevation of the complete device; Fig. 2 is a vertical sectional view thereof; Fig. 3 is a transverse sectional view on the line 3—3 of Fig. 2; Fig. 4 is a transverse sectional view taken on the line 4—4 of Fig. 2; Fig. 5 is a detail view of a portion of the feed regulation mechanism, and Fig. 6 is a detail view of the agitator.

Referring more particularly to the drawings, the reference character 1 designates a suitable receptacle which is preferably cylindrical in cross-section, said receptacle 1 being provided near its upper extremity with a plurality of oppositely disposed ears 2—2 for the attachment thereto of a bail 3 by which the feeder is suspended. A cover 4 is provided for the receptacle, said cover fitting over the top of the receptacle 1. The lower end of the receptacle 1 is closed by an integral bottom 5, which is provided with a central perforation 6 through which the grain contained in the receptacle 1 is discharged. The bottom 5 of the receptacle 1 is provided with a plurality of slots 7, these slots 7 being spaced equidistantly from each other and from the central discharge opening 6.

Mounted centrally of the receptacle 1 is a cylindrical member 8 provided with a removable cover 9 which latter is provided with a central perforation 10 for a purpose to be hereinafter described. Integral with and projecting from the lower end of the cylindrical member 8 is a plurality of depending legs 11, the lower extremity of each of which is reduced as at 12 to form shoulders 13. The reduced portions 12 of the legs 11 are adapted to be passed through the openings 7 in the bottom 5 of the receptacle 1, and are bent at right angles as at 14, thus providing means for attaching the cylindrical member 8 in place. The openings 7 in the bottom 5 of the receptacle 1 are of a size equal to that of the reduced ends 12 of the legs 11, the shoulders 13 of the legs 11 engaging the inner face of the bottom 5 to support the member 8.

As shown in Fig. 3, a flexible band 15 surrounds the cylindrical member 8, said band 15 having two integral perforated ears 16 through which passes a bolt 17 for clamping the flexible band around the member 8. By adjusting the flexible band 15 vertically on the cylindrical member 8 the discharge of grain through the legs 11 thereof is regulated. Passing through the central aperture 6 of the bottom of the receptacle 1 is a rod 20, the upper extremity of which is screw-threaded as at 21 and passes through the central aperture 10 of the cover 9 of the cylindrical member 8. A nut 22 is threaded on the upper end of the rod 20, and provides the means by which the rod 20 is held in place. Lying in contact with the inner face of the bottom 5 of the receptacle 1 is an agitator 23 which comprises four right angularly extending legs 24 which are bent as at 25 to form upwardly projecting extremities 26. At the central portion of the agitator there is provided an aperture 27 through which passes the rod 20. The lower end of the rod 20 is bent as at 30 to provide means for securing an ear of corn 31 thereto. Near the lower end the rod 20 is bent at 32 to throw the ear of corn 31 centrally under the receptacle 1. A grain deflector 33 is secured between the ends of the rod 20, this deflector being conical in shape, and placed on the rod in the inverted position. The deflector is positioned on the rod 20 and supported thereon by bending the rod 20 as at 34.

The operation is as follows: The bait 31 being open to view at all times, the fowl pick the same, thus revolving the rod 20 and the agitator 23. Movement of the agitator 23 disturbs the grain in the receptacle 1, and causes the same to pass between the legs 11 of the cylindrical member 8 and out of the receptacle 1 through the opening 6 in the bottom 5 thereof. The grain falling on the conical deflector 33 is scattered, and the fowl in running therefor are thoroughly exercised.

Having thus described my invention what I claim as new, and desire to protect by Letters Patent is:

A poultry feeder comprising a grain receptacle having a centrally arranged discharge opening in its bottom wall, an inner receptacle arranged concentrically of the grain receptacle and having its lower edge spaced from the bottom of the grain receptacle by means of integral legs which pass through the bottom wall of the grain receptacle, means adjustable with relation to the bottom edge of the inner concentric receptacle to adjust the space between the lower edge thereof and the bottom of the grain receptacle, a bait rod movable within the discharge opening of the grain receptacle, and secured in place by its engagement with the upper wall of the inner concentric receptacle, and an agitator carried by the bait rod and spaced from the bottom of the grain receptacle, the legs of the inner concentric receptacle adapted to limit the rotating movement of the agitator.

In testimony whereof I affix my signature in presence of two witnesses.

GEORGE H. MOORE.

Witnesses:
FRANK L. CLINEFELTER,
J. CLYDE GILFILLAN.

Copies of this patent may be obtained for five cents each, by addressing the "Commissioner of Patents, Washington, D. C."